(12) United States Patent
Turner, Jr.

(10) Patent No.: US 6,269,964 B1
(45) Date of Patent: Aug. 7, 2001

(54) FOOD CONTAINER

(76) Inventor: Ronald L. Turner, Jr., 4465 23$^{rd}$ Pkwy. #203, Temple Hills, MD (US) 20748-4433

( * ) Notice: Subject to any disclaimer, the term of this patent is extended or adjusted under 35 U.S.C. 154(b) by 0 days.

(21) Appl. No.: 09/583,280

(22) Filed: May 31, 2000

(51) Int. Cl.$^7$ .................................................. B65D 43/00
(52) U.S. Cl. ...................... 220/23.86; 220/528; 206/564
(58) Field of Search ............................ 220/23.86, 23.88, 220/528; 206/564

(56) References Cited

U.S. PATENT DOCUMENTS

| | | | |
|---|---|---|---|
| 3,532,247 | * 10/1970 | Bridges | 206/564 X |
| 4,091,953 | * 5/1978 | Daenen | 220/23.86 |
| 4,232,789 | * 11/1980 | Springer | 206/564 X |
| 4,741,441 | * 5/1988 | Keffeler | 220/528 X |
| 4,776,485 | * 10/1988 | Brennan | 206/564 X |
| 5,027,972 | * 7/1991 | Bartholomew | 220/528 X |
| 5,368,183 | * 11/1994 | Singer | 220/528 |
| 5,386,922 | * 2/1995 | Jordan | 220/528 X |

* cited by examiner

Primary Examiner—Steven Pollard
(74) Attorney, Agent, or Firm—Amelia B. Yarbrough

(57) ABSTRACT

A food container having a base section which is filled with insulating material. The base section has removable compartments which are microwavable. The base section has indentations for ease of grasping the removable compartments.

5 Claims, 5 Drawing Sheets

FOOD CONTAINER

FIELD OF THE INVENTION

This invention is directed to a microwavable food container with removable compartments, and is related to pending application Ser. No. 29/106,411, filed Jun. 15, 1999) for a microwavable food container design.

DESCRIPTION OF THE PRIOR ART

The prior art has provided various types of carriers or containers having utility in packing and carrying lunches. Examples of the prior art includes U.S. Pat. No. 5,266,763 to Colombo which illustrates a microwavable container removable from another shell, but not compartmentalized. U.S. Pat. No. 5,277,329 to Pomroy et al illustrate the use of a compartmentalized lunch holder. However the compartments are not removable nor is the lunch holder microwavable. U.S. Pat. No. 4,969,558 to Fisher is directed to a microwavable lunch box apparatus wherein the lid is the microwavable component. The U.S. Pat. No. 5,762,231 to Rider et al illustrates a compartmentalized container with no removable compartments.

SUMMARY OF THE INVENTION

In the prior art, compartmentalized containers have suffered many short comings. The present invention solves these problems with the use of a compartmentalized, microwavable food container in which the compartments are removable.

In accordance with the above, it is the object of the present invention to provide a compartmentalized food container wherein the entire food container is microwavable or the individual compartments can be removed and microwaved separately. This would enable one to carry food that is to be eaten hot and food that is to be eaten cold in the same container. When ready to eat, the cold dish can be removed or visa versa, the dish that is to be eaten hot can be removed, and the hot dish microwaved microwaved.

It is also an objective of the present invention to provide a lid or cover that fits over the compartments to prevent spilling or mixing of the food stuffs in each compartment. If pertubation of the food container occurs, there would be no spilling, leaking or mixing of the contents within any given compartment.

DETAILED DESCRIPTION

Figure 1:
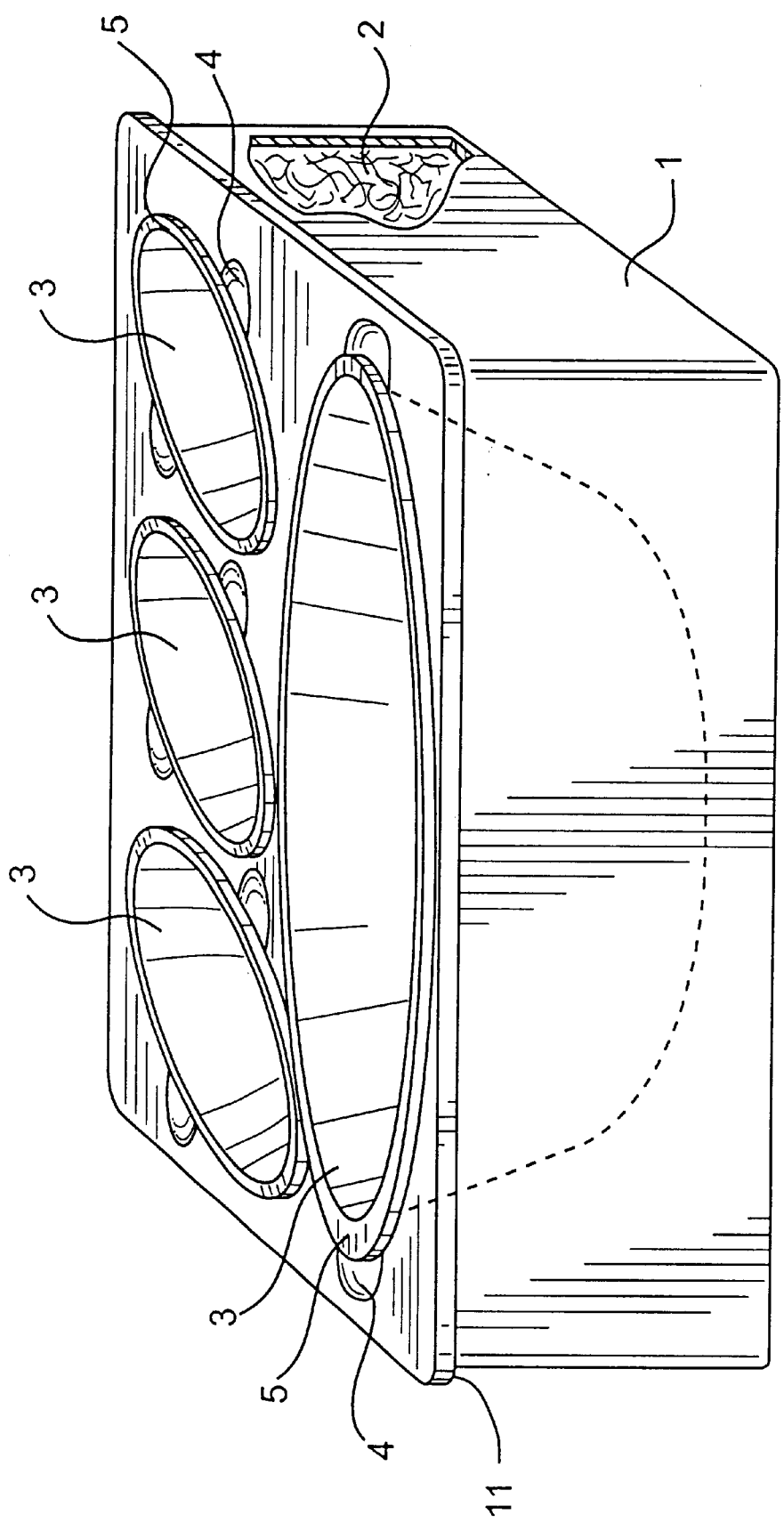
FIG. 1 is a front perspective of a food container with the lid removed for ease of illustration.
Figure 2:
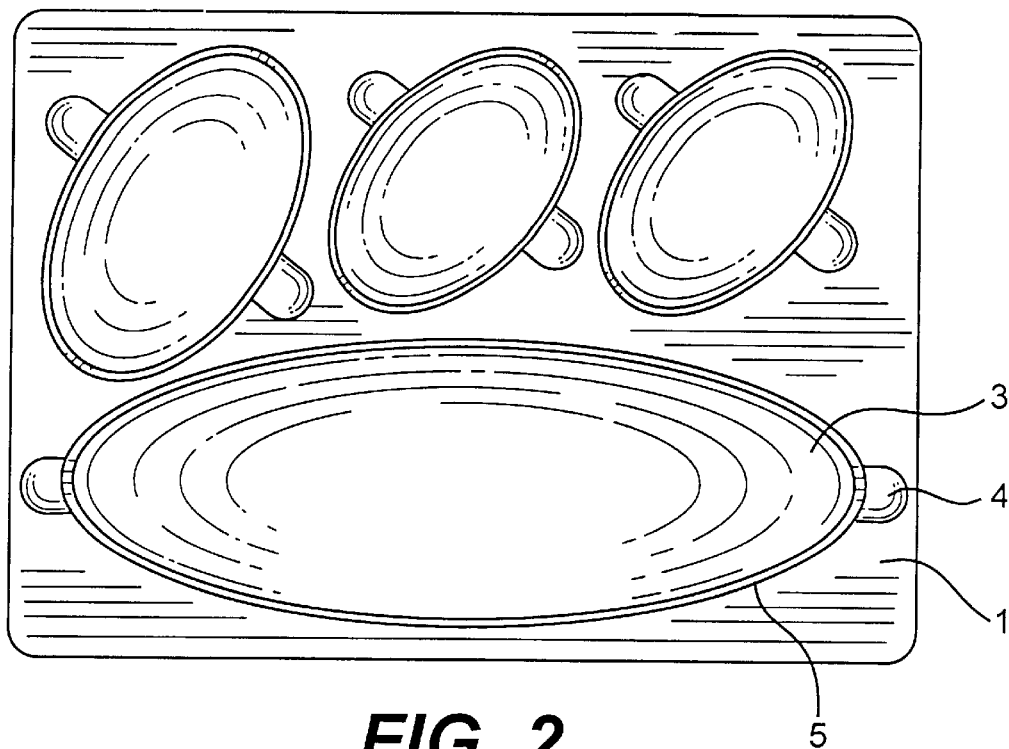
FIG. 2 is the plain top view of the food container.
Figure 3:
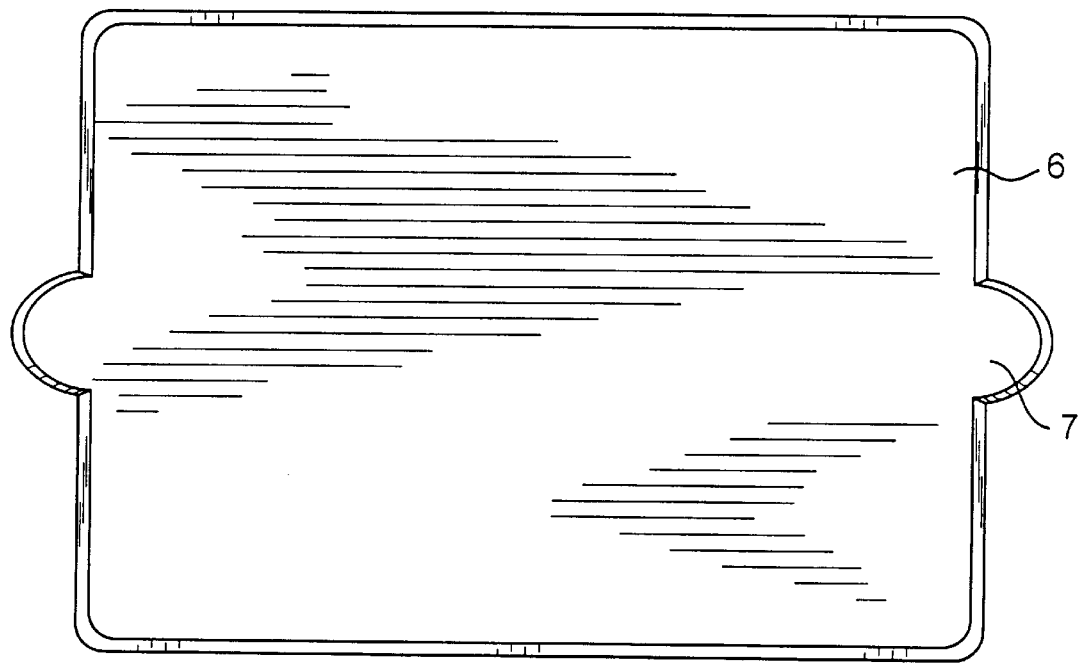
FIG. 3 is the top view of the lid with the embodiment of FIG. 2.
Figure 4:
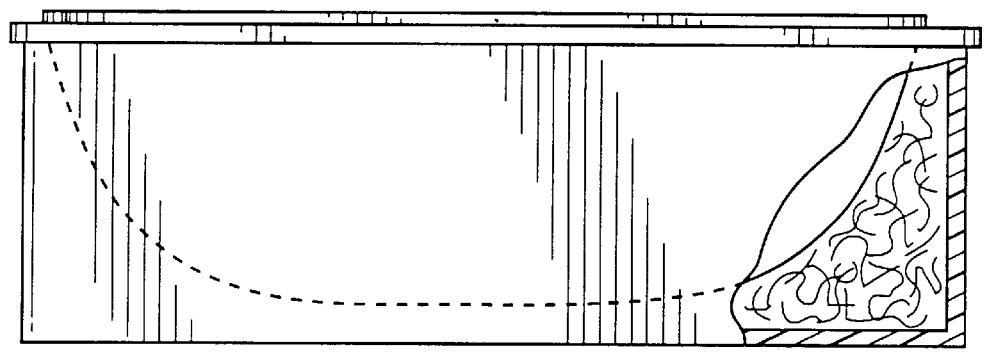
FIG. 4 is the front side view showing insulation of the base.
Figure 5:
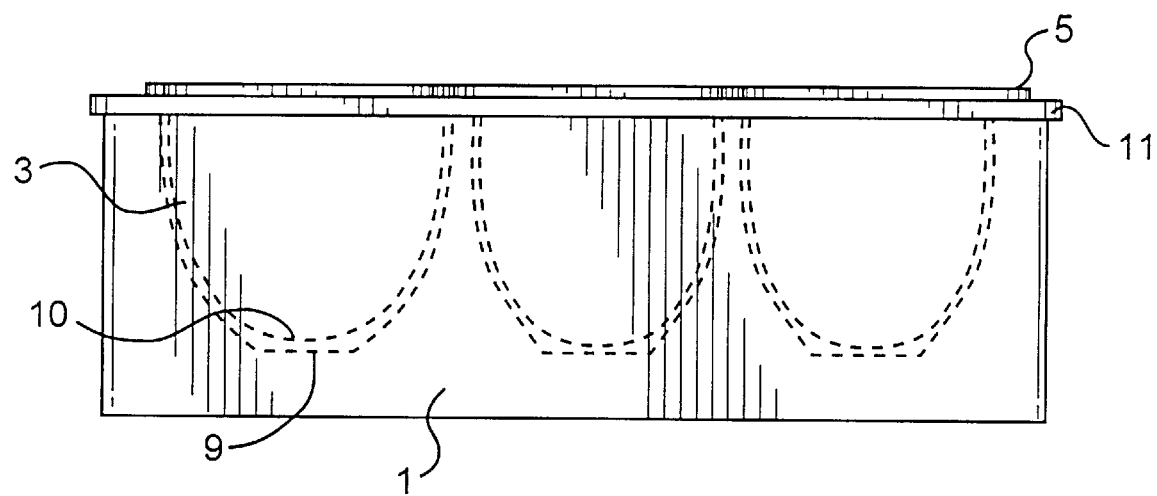
FIG. 5 is the back view.
Figure 6:
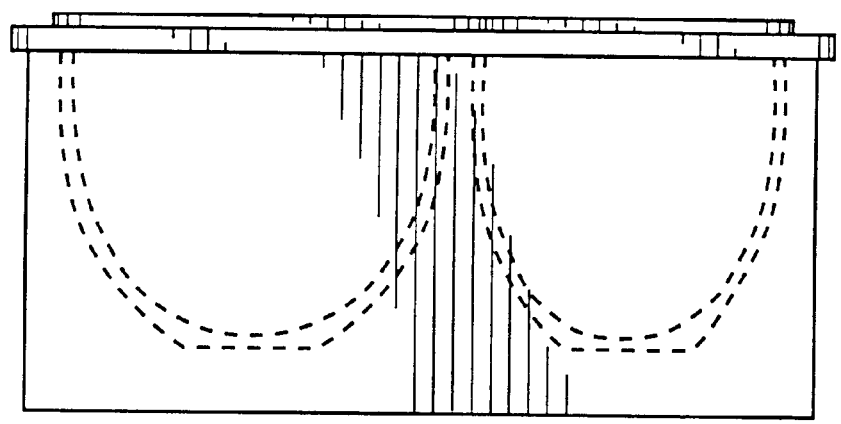
FIG. 6 is the right side view
Figure 7:
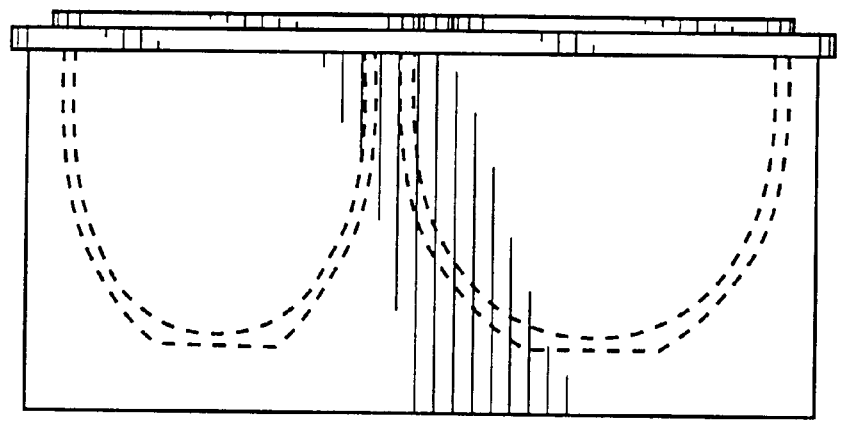
FIG. 7 is the left side view.

As illustrated in the drawings, the food container has a base section 1 which is filled with an insulating material 2, and has removable compartments 3, all of which are microwavable. The indentations 4 are for the ease of grasping the flange 5 which extends over the outer margins of the shoulder and fits over the base section.

Figure 8A:
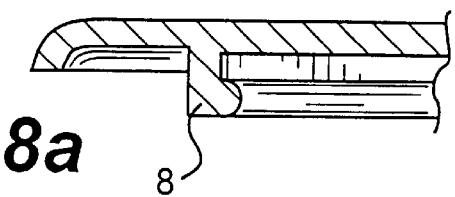
FIG. 8a is the locking means for securing the top to the base
Figure 8:
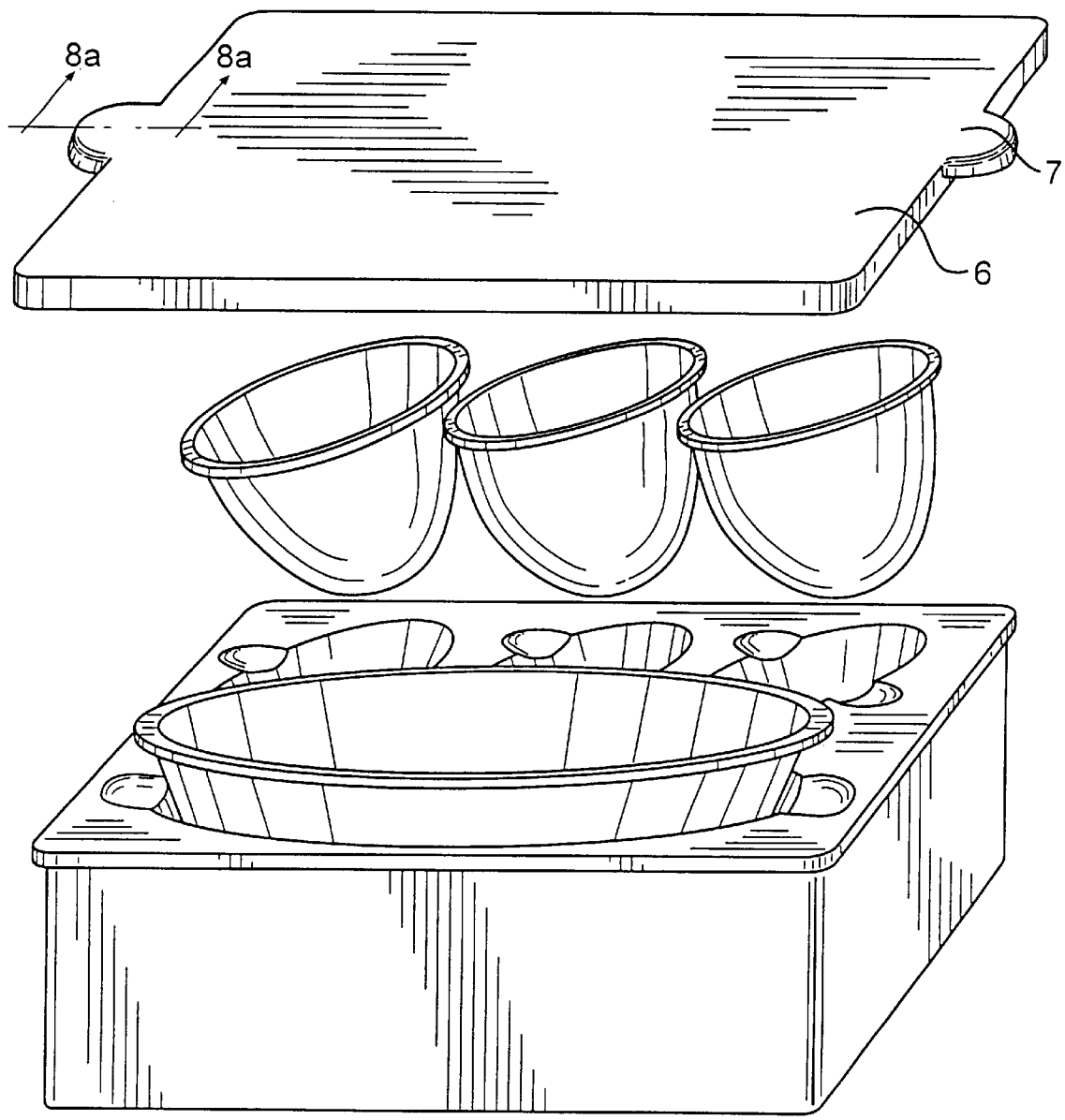
FIG. 8 is an exploded front perspective view of the food container.

The lid 6 has release tabs 7 for removing the lid. FIG. 8(a) shows the locking means for securing the lid to the base. The lid is designed to fit flush with the flange 5 of the compartments 3 to prevent spillage.

The bottom of the removable compartments 3 are flat 9 for stability on a surface The inner surface of the removable compartments 10 are curved for ease of cleaning.

The lip 11 surrounds the upper edge of the base and serves as a locking, unit for the lid.

I claim:

1. A compartmentalized food container comprising:

a base comprising at lease four compartments wherein the compartments are removable if desired, each compartment or the entire container being microwavable;

a. each removable compartment has a flange which extends over the outer margins and fits over the base section;

b. the bottom of each removable compartment is flat for stability on a surface and its inner surface is curved for ease of cleaning;

c. the base has at lease two indentations at the edge of each removable compartment, across from each other for ease of removing the compartment;

and a means for covering the base comprising a lid wherein upon any movement of the base the contents of each compartment is substantially retained.

2. The food container of claim 1, wherein the base is insulated.

3. The food container of claim 1, wherein the means for covering the base is being held in position by the frictional engagement between the lid and the flanges of the removable compartments and cooperating locking means on the lid and the base.

4. The food container of claim 3 wherein the means for covering the base, includes a tab which can be conveniently grasped by the user to remove the cover.

5. The food container of claim 3 wherein the means for covering the base includes a locking means that covers the perimeter of the cover.

* * * * *